(12) United States Patent
Baird et al.

(10) Patent No.: US 11,297,568 B2
(45) Date of Patent: Apr. 5, 2022

(54) LOCATION-BASED APPARATUS MANAGEMENT

(71) Applicant: T-Mobile USA, Inc., Bellevue, WA (US)

(72) Inventors: Joseph Baird, Bellevue, WA (US); Parag Garg, Woodinville, WA (US); Nicholas LaVassar, Issaquah, WA (US); Christopher Painter, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/252,506

(22) Filed: Jan. 18, 2019

(65) Prior Publication Data
US 2020/0236619 A1 Jul. 23, 2020

(51) Int. Cl.
| | |
|---|---|
| *H04W 52/02* | (2009.01) |
| *H04W 4/029* | (2018.01) |
| *H04L 29/08* | (2006.01) |
| *H04W 4/021* | (2018.01) |
| *H04L 67/52* | (2022.01) |

(52) U.S. Cl.
CPC ........ *H04W 52/0209* (2013.01); *H04L 67/18* (2013.01); *H04W 4/021* (2013.01); *H04W 4/029* (2018.02)

(58) Field of Classification Search
CPC ... H04W 52/0209; H04W 4/029; H04W 4/21; H04L 67/18
See application file for complete search history.

(56) References Cited

U.S. PATENT DOCUMENTS

| | | |
|---|---|---|
| 6,462,660 B1 | 10/2002 | Cannon et al. |
| 6,548,990 B2 | 4/2003 | Okuno et al. |
| 7,825,794 B2 | 11/2010 | Janetis et al. |
| 8,851,019 B2 | 10/2014 | Jesurum |
| 9,226,150 B2 | 12/2015 | Li et al. |
| 9,801,017 B2 | 10/2017 | Choi et al. |

(Continued)

FOREIGN PATENT DOCUMENTS

WO 2017142840 A1 8/2017

OTHER PUBLICATIONS

U.S. Appl. No. 16/752,543, Non Final Office Action dated Jul. 8, 2020, 68 pages.

(Continued)

*Primary Examiner* — Ricky Q Ngo
*Assistant Examiner* — Stephen N Steiner
(74) *Attorney, Agent, or Firm* — Han Santos, PLLC

(57) ABSTRACT

Techniques for location-based apparatus management can result in significant battery power savings for the apparatus and robust controls over the apparatus. This may be achieved by using discovered wireless network(s) to learn repeating patterns of the apparatus and, accordingly, set up soft geofences to trigger automatic operations of the apparatus. Information associated with the discovered wireless network(s) is used to determine the location of the apparatus, and the type of location can be identified. Based on the type of location, the apparatus is placed in a mode corresponding to the identified type of location. Alternatively, or additionally, specific features and/or applications on the apparatus may be activated or deactivated.

20 Claims, 8 Drawing Sheets

(56) References Cited

U.S. PATENT DOCUMENTS

| | | |
|---|---|---|
| 9,820,231 B2 | 11/2017 | Gorgenyi et al. |
| 9,967,391 B2 | 5/2018 | Frenz et al. |
| 9,998,866 B2 | 6/2018 | Natucci, Jr. et al. |
| 10,395,452 B2 | 8/2019 | Morrison et al. |
| 10,484,090 B2 | 11/2019 | Saes et al. |
| 10,750,044 B2 | 8/2020 | Hayashi et al. |
| 10,764,907 B2 | 9/2020 | Ravindran et al. |
| 2006/0055536 A1 | 3/2006 | Jackson |
| 2006/0066450 A1 | 3/2006 | Jackson |
| 2006/0221893 A1 | 10/2006 | Kiss |
| 2007/0150607 A1 | 6/2007 | Flinchem et al. |
| 2008/0191866 A1 | 8/2008 | Falck et al. |
| 2009/0231125 A1 | 9/2009 | Baldus et al. |
| 2009/0289844 A1 | 11/2009 | Palsgrove et al. |
| 2010/0027513 A1 | 2/2010 | Ikeda |
| 2010/0123560 A1* | 5/2010 | Nix .................. H04Q 9/00 340/10.4 |
| 2010/0138581 A1 | 6/2010 | Bird et al. |
| 2011/0092161 A1 | 4/2011 | Dotan |
| 2011/0274093 A1 | 11/2011 | Sing et al. |
| 2011/0297090 A1 | 12/2011 | Chamberlain et al. |
| 2012/0034946 A1 | 2/2012 | Skalicky |
| 2012/0090038 A1 | 4/2012 | Pacella et al. |
| 2012/0309376 A1* | 12/2012 | Huang et al. ........... H04W 4/02 455/418 |
| 2013/0159749 A1* | 6/2013 | Moeglein .......... H04W 52/0229 713/323 |
| 2014/0073300 A1 | 3/2014 | Leeder et al. |
| 2014/0141795 A1* | 5/2014 | Abraham ............... H04M 1/00 455/456.1 |
| 2014/0241354 A1 | 8/2014 | Shuman et al. |
| 2014/0244834 A1 | 8/2014 | Guedalia et al. |
| 2014/0251233 A1 | 9/2014 | Bianchi et al. |
| 2014/0331295 A1 | 11/2014 | Kumar et al. |
| 2015/0046330 A1 | 2/2015 | Hanafi et al. |
| 2015/0350410 A1 | 12/2015 | Weiss et al. |
| 2016/0021506 A1 | 1/2016 | Bonge, Jr. |
| 2016/0044628 A1* | 2/2016 | Nakao .................. H04W 4/023 455/456.2 |
| 2016/0266606 A1 | 9/2016 | Ricci |
| 2016/0287097 A1 | 10/2016 | Pradeep et al. |
| 2016/0292576 A1 | 10/2016 | Pradeep et al. |
| 2016/0302393 A1 | 10/2016 | Pradeep et al. |
| 2017/0111763 A1 | 4/2017 | Morgan et al. |
| 2017/0132900 A1 | 5/2017 | Lee et al. |
| 2017/0357835 A1 | 12/2017 | Oono et al. |
| 2018/0121993 A1 | 5/2018 | Agarwal et al. |
| 2018/0159958 A1 | 6/2018 | Olive et al. |
| 2018/0184253 A1 | 6/2018 | Lorenzo et al. |
| 2018/0255428 A1 | 9/2018 | Bagchi et al. |
| 2018/0295472 A1 | 10/2018 | High et al. |
| 2018/0332033 A1 | 11/2018 | Lakhani et al. |
| 2018/0365964 A1 | 12/2018 | Carson et al. |
| 2018/0376417 A1 | 12/2018 | Wang et al. |
| 2019/0087087 A1 | 3/2019 | Ono |
| 2019/0156643 A1 | 5/2019 | Quilter |
| 2019/0171988 A1 | 6/2019 | Kwatra et al. |
| 2019/0208356 A1 | 7/2019 | Danknick |
| 2019/0289158 A1 | 9/2019 | Inoue |
| 2019/0371102 A1 | 12/2019 | Prostko et al. |
| 2020/0042947 A1 | 2/2020 | Rakshit et al. |
| 2020/0125921 A1 | 4/2020 | Manico et al. |
| 2020/0187452 A1 | 6/2020 | Daniel |
| 2020/0235994 A1 | 7/2020 | Rusev et al. |
| 2020/0296234 A1 | 9/2020 | Saita |

OTHER PUBLICATIONS

Bachpalle et al., Integration of Sensors for Location Tracking using Internet of Things (Year: 2018).

Balakrishnan et al., Efficient Geo-Tracking and Adaptive Routing of Mobile Assets (Year: 2009).

Garzon et al., Infrastructure-Assisted Geofencing Proactive Location-Based Services with Thin Mobile Clients and Smart Servers (Year: 2015).

He et al., User privacy and data trustworthiness in mobile crowd sensing (Year: 2015).

U.S. Appl. No. 16/752,543, Notice of Allowance dated Jan. 27, 2021, 64 pages.

Kulshrestha, et al. An Improved Smartphone-based Non-Participatory Crowd Monitoring System in Smart Environments. IEEE Xplore. Jul. 21-24, 2017 [online] [retrieved on Mar. 18, 2021] Retrieved from the Internet URL: <https://ieeexplore.ieee.org/document/8005986>.

Schmitt, et al. OTioT—A Browser-based Object Tracking Solution for the Internet of Things. IEEE Xplore. Feb. 5-8, 2018 [online] [retrieved on Mar. 18, 2021] Retrieved from the Internet URL: <https://ieeexplore.ieee.org/document/8355157>.

Shivhare, et al. A Study on Geo-Location Authentication Techniques. IEEE Xplore. Nov. 14-16, 2014 [online] [retrieved on Mar. 18, 2021] Retrieved from the Internet URL: <https://ieeexplore.ieee.org/document/7065581>.

Tang, et al. A Smart Low-consumption IoT Framework for Location Tracking and Its Real Application. IEEE Xplore. Jun. 17-19, 2016 [online] [retrieved on Mar. 18, 2021] Retrieved from the Internet URL: <https://ieeexplore.ieee.org/document/7589744>.

Thengal, et al. Parameter Sensing and Object Tracking using Global Positioning System. IEEE Xplore. Dec. 15-17, 2016 [online] [retrieved on Mar. 18, 2021] Retrieved from the Internet URL: <https://ieeexplore.ieee.org/document/7977099>.

U.S. Appl. No. 16/690,053, Non-Final Office Action dated Mar. 8, 2021, 57 pages.

U.S. Appl. No. 16/752,543, Notice of Allowance dated Mar. 23, 2021, 72 pages.

U.S. Appl. No. 16/690,053, Final Office Action dated Jul. 9, 2021, 60 pages.

U.S. Appl. No. 16/690,053, Notice of Allowance dated Oct. 12, 2021, 57 pages.

* cited by examiner

LOCATION-BASED APPARATUS MANAGEMENT

BACKGROUND

Location-based services are becoming more and more integral to the daily lives of most users. Specifically, location-based services are offered through a mobile device with the device's geographical location considered. Location information of a mobile device is generally obtained using a positioning sensor (e.g., Global Positioning Satellite (GPS) sensor) that is built in the mobile device although other means (e.g., based on cellular information) can also be used.

One of the applications related to location-based services is the "geofencing" application. A geofencing application allows an administrator to set up triggers for a mobile device to perform a specific operation when crossing one of the boundaries of the geofence. A geofence refers to a virtual perimeter for a real-world geographic area, and a geofence is generally defined using the GPS coordinates provided by a GPS sensor of the mobile device.

However, due to reliance on the operation of the GPS sensor, such geofencing applications may consume significant amounts of battery power, which inevitably reduces the standby time of a mobile device. Moreover, in conventional practices, a user of a mobile device is required to manually enter each geofence, and such task tends to be time-consuming and tedious, thereby resulting in poor user experience.

BRIEF DESCRIPTION OF THE DRAWINGS

Detailed description of various embodiments in accordance with the present disclosure is provided below with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
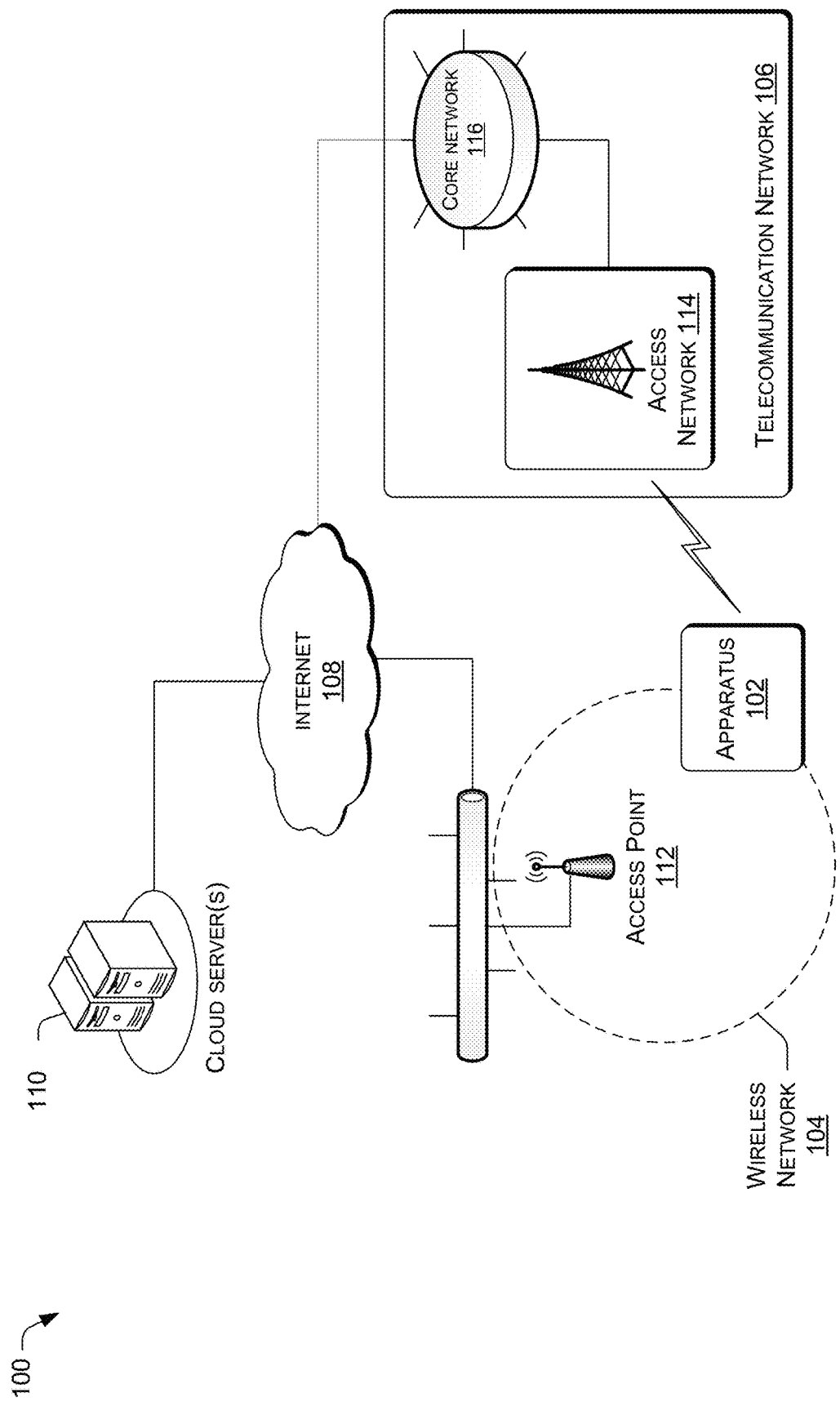
FIG. 1 illustrates an example network architecture of location-based apparatus management.

The present disclosure is directed to techniques for location-based apparatus management, which may be implemented in an apparatus or in a cloud server with which the apparatus is in wireless communication. For example, the techniques for location-based apparatus management may be implemented as an application executed by the apparatus or the cloud server. Such techniques may realize smart apparatus management by using one or more discovered wireless networks to learn one or more repeating patterns of the apparatus (e.g., a smartphone, a smart tag, a smart watch, a tablet Personal Computer (PC), or another Internet-of-Things (IoT) device) and, accordingly, set up soft geofences to trigger automatic operations of the apparatus.

Specifically, the information (e.g., identities) associated with the one or more wireless networks that the apparatus has discovered may be used to determine the location of the apparatus. For example, the identity of a wireless network may refer to a cell identification (ID) of a base station, at least one of a Service Set Identifier (SSID) and a Media Access Control (MAC) address of a Wi-Fi network, a Universal Unique Identifier (UUID) of a Bluetooth Low Energy (BLE) network, or a Unique Identifier (UID) of a Near Field Communication (NFC) network. Information associated with the discovered wireless networks in addition to the dates and times when they are discovered are stored and later processed by the apparatus or the cloud server to identify repeating patterns of the apparatus. For each discovered wireless network in the repeating patterns, a soft geofence, which may be defined by the coverage of the particular wireless network, is created. In contrast, a conventional geofence is typically defined by GPS coordinates.

For each location, a type (e.g., residence, office, restaurant, café, gym, pet daycare, vet clinic, library, school, after-school institute, a friend's house, and a relative's house) of the location may be identified automatically by data mining, cloud sourcing, or using a map tool (e.g., a web-based map application or website). Alternatively, the type of the location may be identified by prompting the user of the apparatus to indicate the type of the location (e.g., "Fred's House"). In addition, a rule associated with each soft geofence may be determined based on the type of the location corresponding to the soft geofence. The rule may indicate specific act(s) related to the apparatus to be performed when the apparatus enters the soft geofence or leaves the soft geofence. For example, the apparatus may be placed in a silent/vibration mode (e.g., put on mute) when it is on a library's premises, or a notification may be sent to a parent when the apparatus carried by a child leaves a school during regular school hours.

Advantageously, significant battery power savings for the apparatus as well as robust controls over the apparatus may be achieved. The techniques described herein may be implemented in a number of ways. Illustrative and non-limiting implementations are provided below with reference to FIGS. 1-8.

Example Architecture

FIG. 1 illustrates an example network architecture 100 of location-based apparatus management. The network architecture 100 may also include an apparatus 102, a wireless network 104, a telecommunication network 106, the Internet 108, and a cloud server 110. The wireless network 104 may be a Short Range Wireless (SRW) network, such as a Wireless-Fidelity (Wi-Fi) network, a Bluetooth Low Energy (BLE) network, a Near Field Communication (NFC) network, or another type of wireless network. The wireless network 104 may be formed by an access point 112 utilizing the Wi-Fi technology, BLE technology, NFC technology, or another wireless technology for providing wireless communication services. The wireless network 104 covers a relatively smaller area (e.g., a house or a floor of a building) when compared to the telecommunication network 106. The telecommunication network 106 may include an access network 114 and a core network 116. The access network 114 is responsible for processing radio signals, terminating radio protocols, and connecting the apparatus 102 with the core network 116, while the core network 116 is responsible for performing mobility management, network-side authentication, and interfaces with public/external networks (e.g., the Internet 108).

The telecommunication network 106 may be a Global System for Mobile communications (GSM) system, General Packet Radio Service (GPRS) system, Enhanced Data rates for Global Evolution (EDGE) system, Universal Mobile Telecommunications System (UMTS) system, Interim Standard 95 (IS-95) system, Code Division Multiple Access 2000 (CDMA 2000) system, CDMA 2000 1× Evolution-Data Optimized or Evolution-Data (CDMA2000 1×EV-DO) system, Time Division-Synchronous Code Division Multiple Access (TD-SCDMA) system, Worldwide Interoperability for Microwave Access (WiMAX) system, Long Term Evolution (LTE) system, Time-Division LTE (TD-LTE) technology, LTE-Advanced (LTE-A) system, or others.

When the telecommunication network 106 is a GSM/GPRS/EDGE system, the access network 114 may be a GSM EDGE Radio Access Network (GERAN) which includes at least a Base Transceiver System (BTS) and a Base Station Controller (BSC), and the core network 116 may be a GPRS core which includes at least a Mobile Switching Center (MSC), Home Location Register (HLR), Serving GPRS Support Node (SGSN), and Gateway GPRS Support Node (GGSN).

When the telecommunication network 106 is a UMTS system, the access network 114 may be a Universal Terrestrial Radio Access Network (UTRAN) which includes at least one BS and at least one Radio Network Controller (RNC), and the core network 116 may be a GPRS core which includes at least an MSC, HLR, SGSN, and GGSN.

When the telecommunication network 106 is a LTE/TD-LTE/LTE-A system, the access network 114 may be an Evolved-Universal Terrestrial Radio Access Network (E-UTRAN) which includes at least one evolved NodeB (eNB) (e.g., macro eNB, femto eNB, or pico eNB), and the core network 116 may be an Evolved Packet Core (EPC) which includes a Home Subscriber Server (HSS), Mobility Management Entity (MME), Serving Gateway (S-GW), and Packet Data Network Gateway (PDN-GW or P-GW).

In another embodiment, the wireless network 104 may be formed by one or more picocell or femtocell base stations which are connected to the core network 116 through the Internet 108, serving as an extension of the telecommunication network 106.

The apparatus 102 may be a feature phone, a smartphone, a smart tag, a smart watch, a tablet PC, a phablet, or any other device that is capable of wireless communication with the wireless network 104 and the telecommunication network 106 for location-based apparatus management in accordance with various embodiments of the present disclosure. In one embodiment, the apparatus 102 may perform network scanning periodically or dynamically to discover wireless networks nearby, and the apparatus 102 may store information associated with the discovered wireless networks (e.g., identities of discovered wireless networks), and the dates and times when they are discovered, in a pattern record, which may be in apparatus 102, in cloud server 110, or in both apparatus 102 and cloud server 110. The location of the apparatus 102 may be determined based on the information associated with the discovered wireless networks. The identity of a wireless network may include in at least one of a Service Set Identifier (SSID) and a Media Access Control (MAC) address of a Wi-Fi network, a Universal Unique Identifier (UUID) of a BLW network, a Unique Identifier (UID) of a NFC network, or a cell ID of a base station (e.g., a picocell or femtocell base station).

Each identity in the pattern record may be mapped or otherwise correlated to a type of location such as, for example and without limitation, home, office, café, gym, pet daycare, vet clinic, library, school, after-school institute, friend's house, relative's house, and so on.

Based on the mapping, upon discovering a wireless network nearby, the apparatus 102 or cloud server 110 may determine the type of location corresponding to the identity of the discovered wireless network, and trigger the apparatus 102 to perform one or more acts according to one or more rules predetermined for the type of location. The one or more acts may include, for example and without limitation, entering a mode corresponding to the type of location (e.g., entering a low-power mode when the type of location is "home"). As another example, the one or more acts may include activating or deactivating one or more features or applications on the apparatus 102. When the apparatus 102 enters the low-power mode, one or more functions, features or applications may be deactivated or modified so as to reduce power consumption. For example, when the apparatus 102 enters the low-power mode, a GPS sensor of the apparatus 102 may be deactivated. Alternatively, or additionally, the time interval for pinging the telecommunication network 106 may be increased. Still alternatively, or additionally, when the apparatus 102 enters the low-power mode, the apparatus 102 may send a notification to alert a user (e.g., a parent or a pet owner) in response to the apparatus 102 leaving the coverage of a wireless network (e.g., when the apparatus 102 is no longer able to communicate with the wireless network 104).

In another embodiment, the apparatus 102 may send the pattern record to the cloud server 110 through the Internet 108 or the telecommunication network 106. The cloud server 110 may be capable of keeping the pattern record, the mapping between identities of wireless networks and corresponding types of locations, and the rules corresponding to the types of locations. The cloud server 110 may also be capable of determining a type of location and a rule for a discovered wireless network. In addition, the cloud server 110 may further send an instruction to the apparatus 102 to trigger the apparatus 102 to perform act(s) as described herein.

Example Apparatus Components

Figure 2:
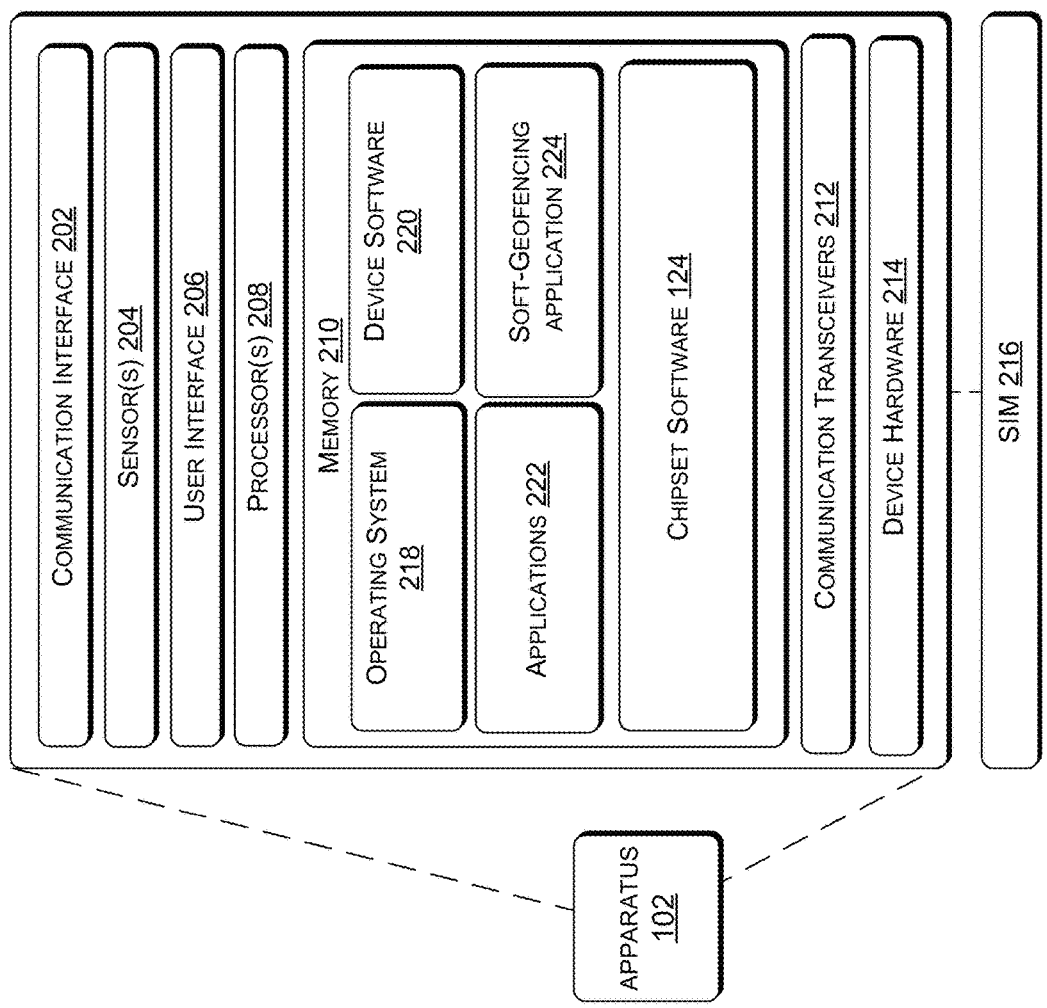
FIG. 2 is a block diagram showing various components of an apparatus for location-based apparatus management.

FIG. 2 is a block diagram showing various components of the apparatus 102 for location-based apparatus management. The apparatus 102 may include a communication interface 202, one or more sensors 204, a user interface 206, one or more processors 208, and memory 210. The communication interface 202 may include wireless and/or wired communication components that enable the apparatus 102 to communicate with the wireless network 104 and the telecommunication network 106, as well as other telecommunication and/or data communication networks. The sensors 204 may include a proximity sensor, a compass, an accelerometer, altimeter, cameras, and/or a GPS sensor. The proximity sensor may detect movement of objects that are proximate the apparatus 102. The compass, the accelerometer, and the GPS sensor may detect orientation, movement, and geolocation of the apparatus 102.

In one embodiment, the apparatus 102 may be in communication with the wireless network 104 and/or the telecommunication network 106 during network scanning to receive broadcast messages therefrom, without establishing connection(s) to the wireless network 104 and/or the telecommunication network 106. In another embodiment, the apparatus 102 may establish connection(s) to the wireless network 104 and/or the telecommunication network 106 for further communications with the wireless network 104 and/or the telecommunication network 106.

The user interface 206 may enable a user to provide input and receive output/prompts from the apparatus 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using one or more non-transitory computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically-Erasable Programmable Read-Only Memory (EEPROM), flash memory or other memory technology, Compact Disc Read-Only Memory (CD-ROM), digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The apparatus 102 may also include communication transceivers 212 and other device hardware 214. The communication transceivers 212 are hardware components that enable the apparatus 102 to perform telecommunication and data communication with the multiple communications network, such as the wireless network 104 and the telecommunication network 106. The device hardware 214 may include other hardware that is typically located in a mobile communication device. For example, the device hardware 214 may include signal converters, transceivers, antennas, hardware decoders and encoders, graphic processors, a Subscriber Identity Module (SIM) card slot, and/or the like that enable the apparatus 102 to execute applications and provide telecommunication and data communication functions. The SIM 216 may be an integrated circuit chip that is inserted into the SIM card slot of the apparatus 102, or an embedded SIM that is hardwired into the circuit board of the apparatus 102.

The one or more processors 208 and the memory 210 of the apparatus 102 may implement an operating system 218, device software 220, one or more applications 222, and chipset software 124. The various software and applications may include routines, program instructions, objects, and/or data structures that perform particular tasks or implement particular abstract data types. The operating system 218 may include components that enable the apparatus 102 to receive and transmit data via various interfaces (e.g., user controls, communication interface 202, and/or memory input/output devices). The operating system 218 may also process data using the one or more processors 208 to generate output based on input that are received via the user interface 206. For example, the operating system 218 may provide an execution environment for the execution of the applications 222. The operating system 218 may include a presentation component that presents the output (e.g., display the data on an electronic display, store the data in memory, transmit the data to another electronic device, etc.).

The operating system 218 may include an interface layer that enables applications to interface with the communication transceivers 212 and/or the communication interface 202. The interface layer may comprise public Application Programming Interfaces (APIs), private APIs, or a combination of both public APIs and private APIs. Additionally, the operating system 218 may include other components that perform various other functions generally associated with an operating system. The device software 220 may include software components that enable the apparatus 102 to perform functions. For example, the device software 220 may include Basic Input/Output System (BIOS), Boot ROM, or a bootloader that boots up the apparatus 102 and executes the operating system 218 following power up of the apparatus 102.

The applications 222 may include applications that provide utility, entertainment, and/or productivity functionalities to a user of the apparatus 102. For example, the applications 222 may include electronic mail applications, remote desktop applications, web browser applications, navigation applications, office productivity applications, multimedia streaming applications, and/or so forth. The one or more processors 208 and the memory 210 may further implement a soft-geofencing application 224 for carrying out various embodiments of location-based apparatus management in accordance with the present disclosure. The chipset software 124 may include applications that implement the protocol stack for communications with the wireless network 104 and the telecommunication network 106.

Example Cloud Server Components

Figure 3:
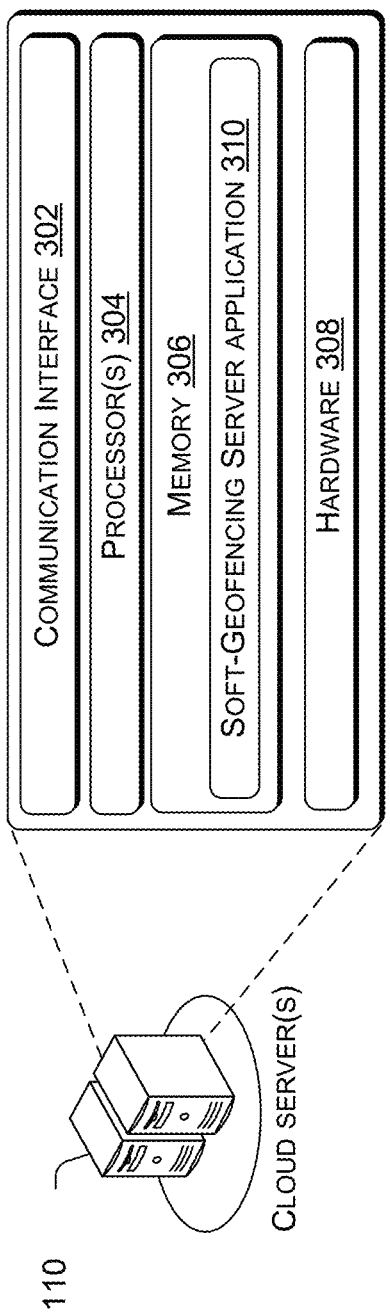
FIG. 3 is a block diagram showing various components of a cloud server for location-based apparatus management.

FIG. 3 is a block diagram showing various components of the cloud server 110 for location-based apparatus management. The cloud server 110 may include a communication interface 302, one or more processors 304, memory 306, and hardware 308. The communication interface 302 may include wireless and/or wired communication components that enable the cloud server 110 to transmit data to and receive data from other networked devices, such as the apparatus 102. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using one or more non-transitory computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, Digital Versatile Disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 304 and the memory 306 of the cloud server 110 may execute a soft-geofencing server application 310 that interacts with the soft-geofencing application 224 on the apparatus 102 to carry out various embodiments of location-based apparatus management in accordance with the present disclosure. In some instances, the software soft-geofencing management application 310 may trigger the soft-geofencing application 224 to perform one or more acts according to one or more rules predetermined based on different types of detected locations.

Example Processes

Figure 4:
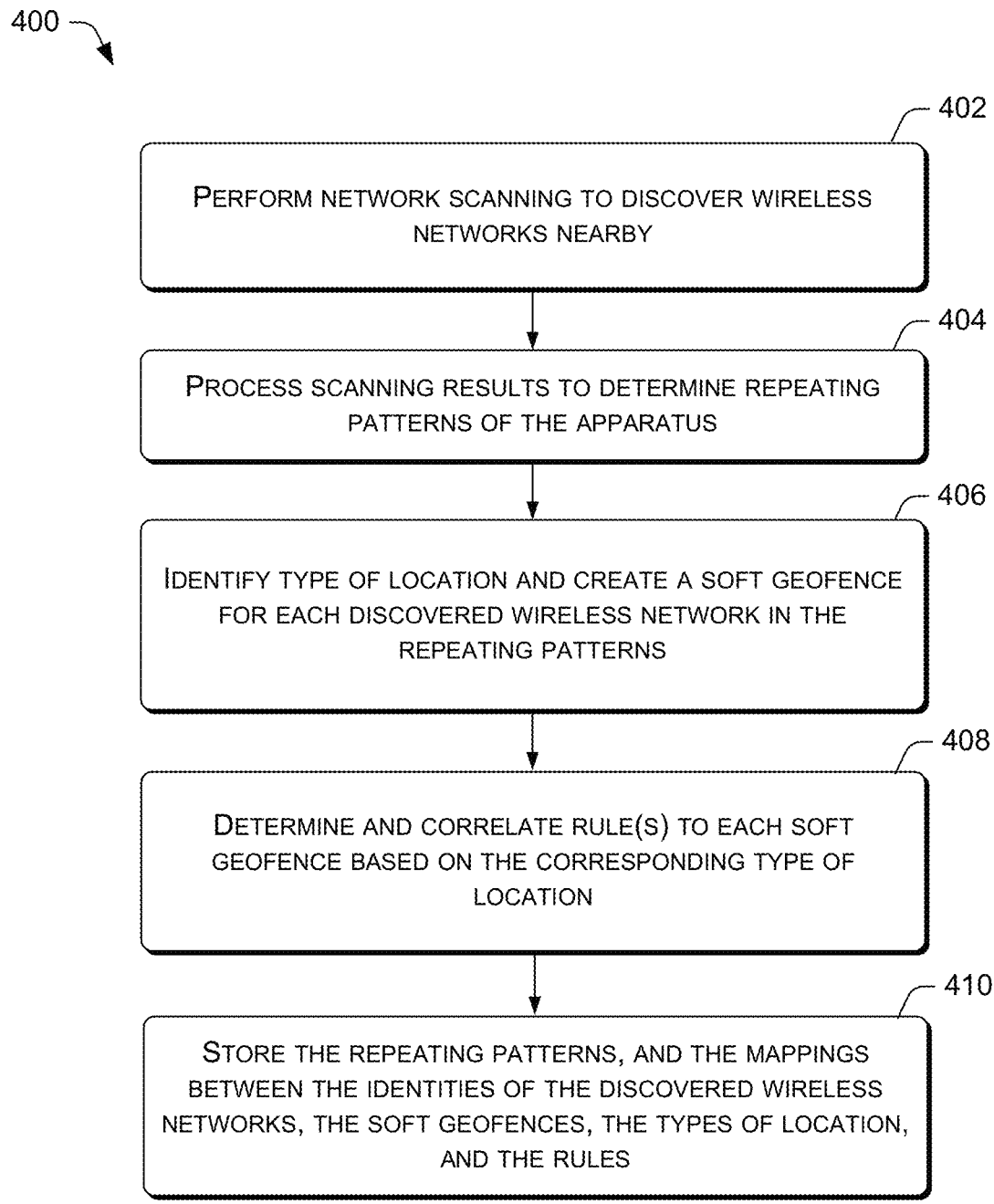
FIG. 4 is a flow diagram of an example process for setting up soft geofences.
Figure 5:
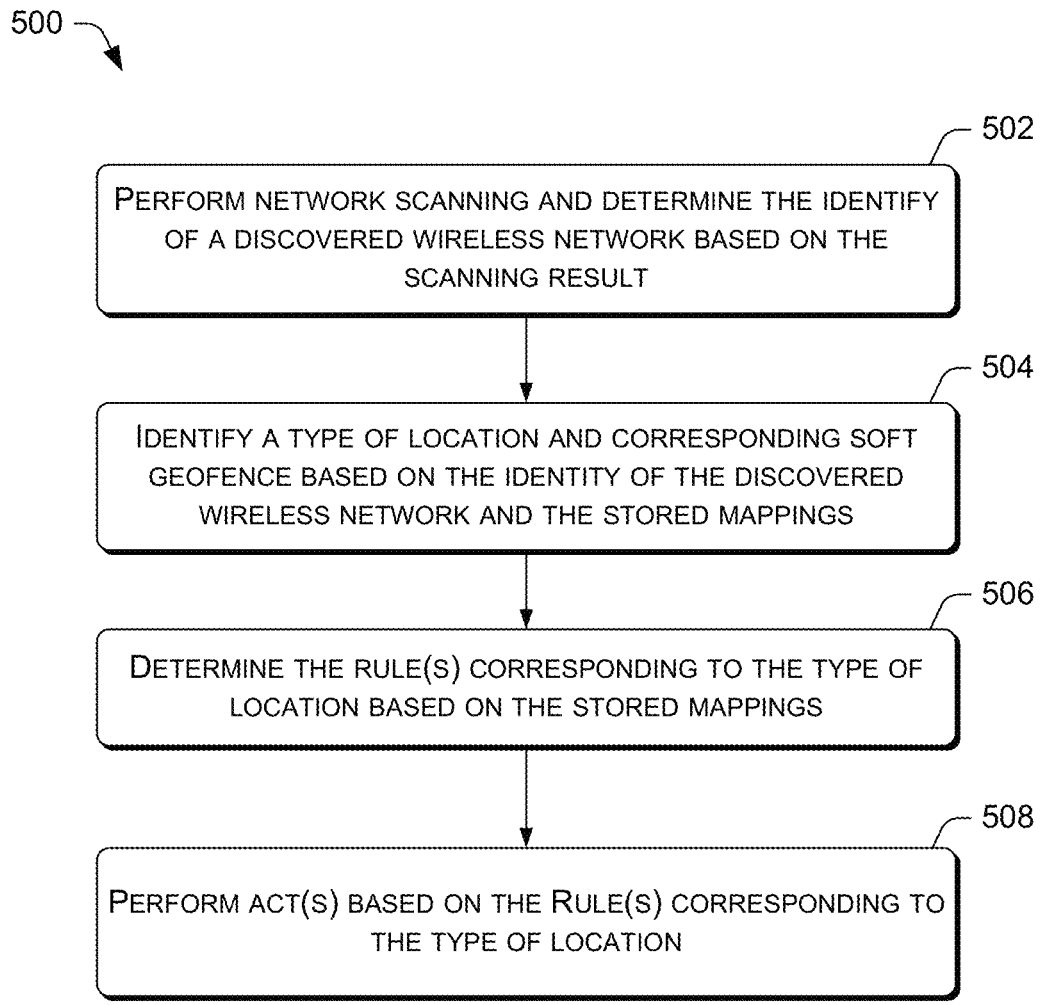
FIG. 5 is a flow diagram of an example process for using soft geofences to manage operations of an apparatus.

FIGS. 4 and 5 present illustrative processes 400 and 500 with respect to various aspects of location-based apparatus management. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 400 and 500 are described in the context of the network architecture 100 of FIG. 1.

FIG. 4 is a flow diagram of an example process 400 for setting up soft geofences. At block 402, the apparatus 102 may periodically perform network scanning to discover wireless networks nearby. For each network scanning, a scanning result including information associated with discovered wireless networks may be obtained, such as the identities (e.g., SSID and MAC address) of discovered wireless networks (e.g., a Wi-Fi network), and the dates and times when the wireless networks are discovered.

At block 404, the scanning results obtained during a period of time (e.g., a week) may be processed to determine one or more repeating patterns of the apparatus 102. Specifically, a repeating pattern may include an identity of a wireless network, and a time slot of a day in which the wireless network remained discoverable by the apparatus 102. In one embodiment, the repeating patterns may be maintained locally in the apparatus 102. In another embodiment, the repeating patterns may be maintained remotely in the cloud server 110.

At block 406, a type of location for each discovered wireless network in the repeating patterns may be identified and a soft geofence for each discovered wireless network may be created. In one embodiment, the type of location may be identified by data mining, cloud sourcing, or using a map tool. In another embodiment, the apparatus 102 may prompt the user of the apparatus 102 to enter the type of location for each discovered wireless network.

At block 408, one or more rules may be determined and correlated to each soft geofence based on the corresponding type of location. In one embodiment, the rules may be determined based on the usage history of the apparatus 102. For example, the usage history may indicate that high usage of the apparatus 102 was observed in the past when the apparatus 102 was in a first type of location, and a rule to place the apparatus 102 in a full-power mode may be determined/created and associated to the first type of location. Alternatively, the usage history may indicate that minimal usage of the apparatus 102 was observed in the past when the apparatus 102 was in a second type of location, and a rule to place the apparatus 102 in a low-power mode may be determined/created and associated to the second type of location. In another embodiment, the apparatus 102 may prompt the user of the apparatus 102 to enter the rules corresponding to the identified types of location.

At block 410, the apparatus 102 may store the repeating patterns, along with the mapping between the identities of the discovered wireless networks, the soft geofences, the types of location and the corresponding rules, in a local storage medium (e.g., the memory 210), in the cloud server 110 or in both the memory 210 and cloud server 110.

FIG. 5 is a flow diagram of an example process 500 for using soft geofences to manage operations of the apparatus 102. At block 502, the apparatus 102 may perform network scanning and determine the identify of a discovered wireless network based on a scanning result.

At block 504, based on the identity of the discovered wireless network and the stored mapping, a type of location where the apparatus 102 is located and the corresponding soft geofence may be identified.

At block 506, based on the stored mapping, one or more rules corresponding to the type of location may be determined.

At block 508, the apparatus 102 may perform one or more acts based on the one or more rules. The one or more acts may include placing the apparatus 102 in a mode (e.g., low-power mode, full-power mode or silent/vibration mode). Alternatively, or additionally, the one or more acts may include activating or deactivating one or more features or applications on the apparatus 102. For example, one of the features/applications to be activated may include sending a notification to alert a user, such as the user of the apparatus 102, or a close associate (e.g., a parent or a pet owner) of the user of the apparatus 102, in response to the location of the apparatus 102 having changed (e.g., the apparatus 102 leaving the soft geofence).

Figure 6:
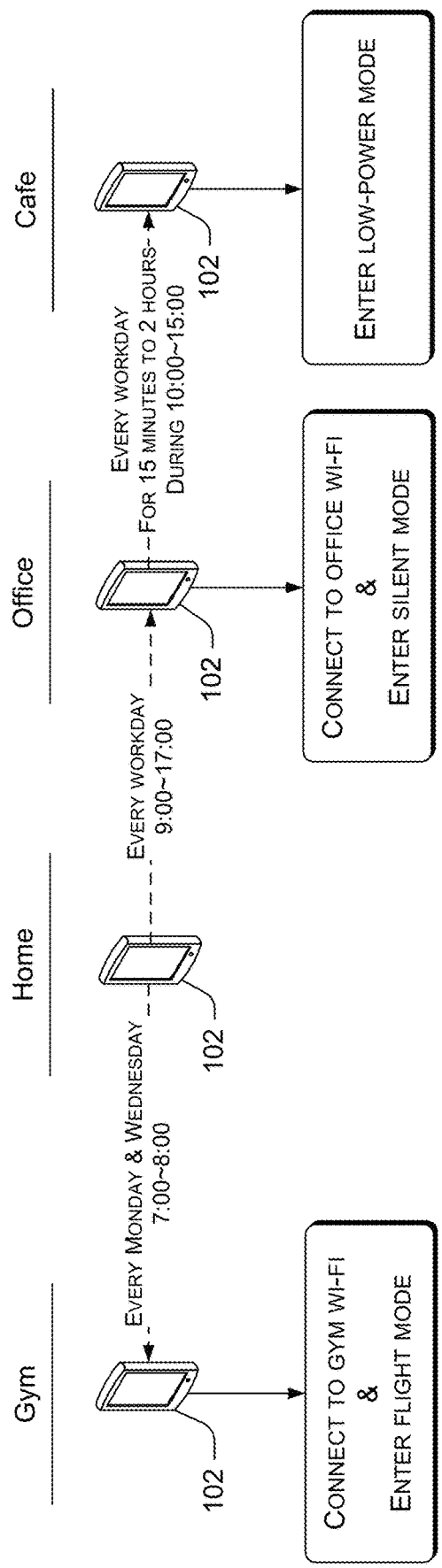
FIG. 6 is an illustrative diagram of location-based apparatus management in a professional scenario.

FIG. 6 is an illustrative diagram of location-based apparatus management in an example scenario. In this scenario, the apparatus 102 is a smart phone and is programmed with a Wi-Fi network.

In this scenario, every Monday and Wednesday morning from 7:00 to 8:00, a user of apparatus 102 goes to the gym with apparatus 102, and the apparatus 102 may discover the Wi-Fi network located at the gym during these time slots. After observing this behavior repeatedly as a repeating pattern, the apparatus 102 may activate the communication transceivers 212 to connect to the gym Wi-Fi network and enter a specific mode (e.g., the flight mode if the gym is at the basement where cellular signals are lost) corresponding to the type of location—"gym" during these time slots.

Every workday from 9:00 to 17:00, the user goes to the office and the apparatus 102 may discover the Wi-Fi network(s) located at the office during these time slots. After observing this behavior repeatedly as a repeating pattern, the apparatus 102 may activate the communication transceivers 212 to connect to the office Wi-Fi network and enter a specific mode (e.g., the silent/vibration mode) corresponding to the type of location—"office" during these time slots. In one embodiment, multiple Wi-Fi routers may be located at the office and configured with the same SSID. In another embodiment, multiple Wi-Fi routers may be configured with different SSIDs and located different areas of the office, and all these SSIDs may correspond to the same location.

On the workdays, the user usually goes to a café for 15 minutes to 2 hours between 10:00 and 15:00, and the apparatus 102 may discover the Wi-Fi network located at the cafe during these time slots. After observing this behavior repeatedly as a repeating pattern, the apparatus 102 may enter a specific mode (e.g., the low-power mode) for a period of time (e.g., 15 minutes) when it discovers the cafe Wi-Fi network in two or more successive scans during these time slots.

Figure 7:
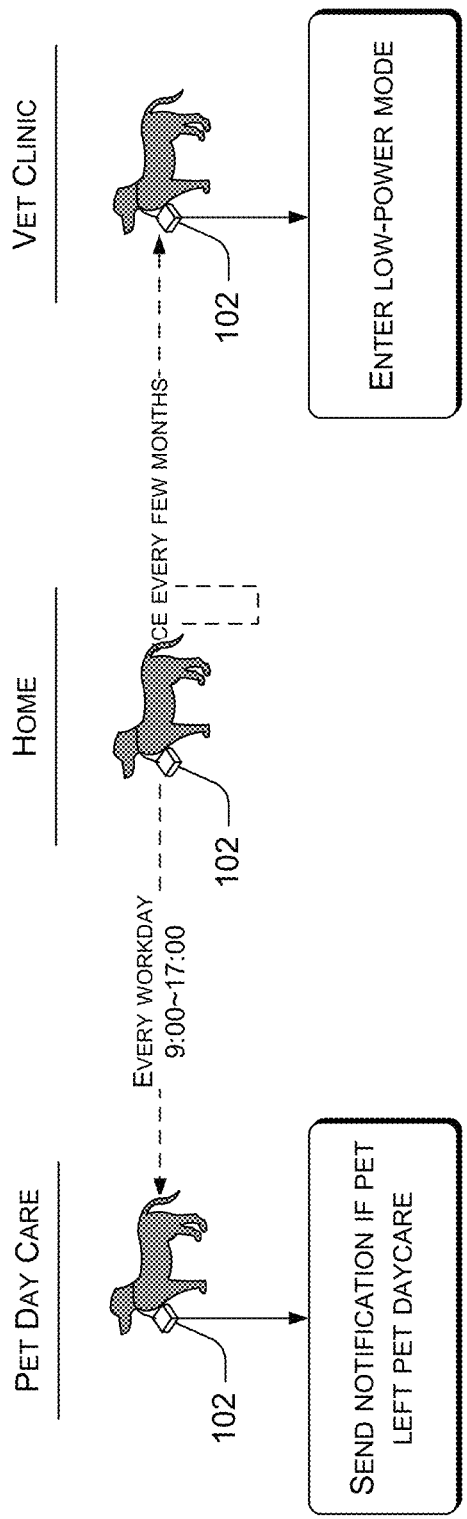
FIG. 7 is an illustrative diagram of location-based apparatus management in a pet scenario.

FIG. 7 is an illustrative diagram of location-based apparatus management in another example scenario. In this scenario, the apparatus 102 is a smart tag worn by a pet and is configured to use multiple Wi-Fi networks as soft geofences for notifications and low-power modes.

In this scenario, every workday from 9:00 to 17:00, the pet is brought to a pet daycare and the apparatus 102 may discover the Wi-Fi network located at the pet daycare during these time slots. After observing this behavior repeatedly as a repeating pattern, the apparatus 102 may automatically set up a soft geofence for the type of location—"pet daycare," and send a notification to alert the owner when the pet leaves this soft geofence during these time slots.

Once every few months, the pet is brought to a vet clinic and the apparatus 102 may discover the Wi-Fi network located at the vet clinic during these time slots. After observing this behavior repeatedly as a repeating pattern, the apparatus 102 may automatically set up a soft geofence for the type of location—"vet clinic", and enter a specific mode (e.g., the low-power mode) when it detects the vet Wi-Fi network in two or more successive scans.

In one embodiment, the type of locations of both the pet daycare and the owner's home may be considered as a "residence" type, and the same rule of notification may be applied for the apparatus 102 when the pet leaves the owner's home during specific time slots (e.g., between 22:00 and 6:00).

Figure 8:
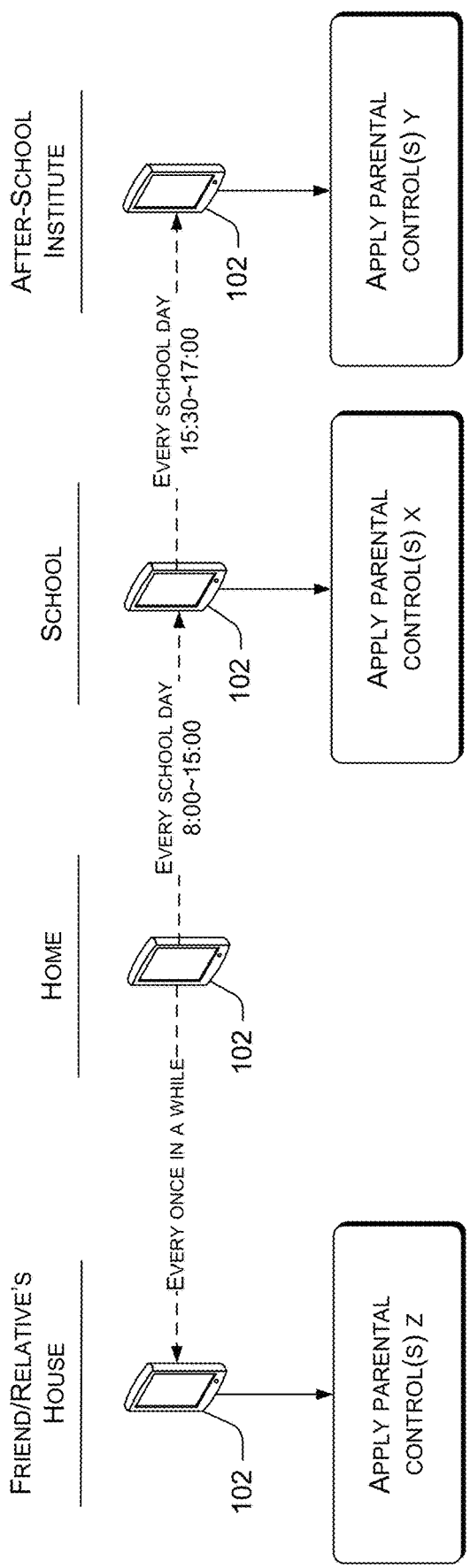
FIG. 8 is an illustrative diagram of location-based apparatus management in a child scenario.

FIG. 8 is an illustrative diagram of location-based apparatus management in yet another example scenario. In this scenario, the apparatus 102 is a smart phone carried by a child and is configured to use the following Wi-Fi networks as soft geofences for parental controls.

In this scenario, every school day from 8:00 to 15:00, the child attends a local school and the apparatus 102 may discover the Wi-Fi network located at the school during these time slots. After observing this behavior repeatedly as a repeating pattern, the apparatus 102 may automatically set up a soft geofence for the type of location—"school", and parental controls may be applied on the apparatus 102 during these time slots. The parental controls may include sending a notification to the parent when the child leaves this soft geofence during these time slots. Alternatively, or additionally, the parental controls may include blocking or limiting specific features/applications (e.g., the "App Store purchases" feature or gaming applications) on the apparatus 102.

Every school day from 15:30 to 17:00, the child attends an after-school institute and the apparatus 102 may discover the Wi-Fi network located at the after-school institute during these time slots. After observing this behavior repeatedly as a repeating pattern, the apparatus 102 may automatically set up a soft geofence for the type of location—"after-school institute", and the same or different parental controls (i.e., different rules) may be applied on the apparatus 102 during these time slots.

Every once in a while, the child visits a friend or relative's house and the apparatus 102 may discover the Wi-Fi network located at the house during these time slots. After observing this behavior repeatedly as a repeating pattern, the same or different parental controls may be applied on the apparatus 102 when the apparatus 102 discovers the friend/relative's Wi-Fi network in two or more successive scans.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   determining, by a processor of an apparatus, a location of the apparatus based on information associated with a wireless network with which the apparatus is in communication;
   identifying, by the processor, a type of the location and a Wi-Fi network associated with the type of the location; and
   performing, by the processor based on a result of the identifying, one or more of a plurality of acts comprising:
   detecting a repeating behavior pattern that includes a high usage within a time slot at the location;
   associating the high usage at the time slot with the identified type of the location; and
   configuring the apparatus to activate a full-power mode when the processor detects the Wi-Fi network at the identified type of the location.

2. The method of claim 1, further comprising identifying a change in the location of the apparatus; and
   placing the apparatus in a low-power mode in response to the change in the location of the apparatus.

3. The method of claim 1, wherein the information associated with the wireless network comprises a cell identification (ID) of a base station, at least one of a Service Set Identifier (SSID) and a Media Access Control (MAC) address of the Wi-Fi network, a Universal Unique Identifier (UUID) of a Bluetooth Low Energy (BLE) network, or a Unique Identifier (UID) of a Near Field Communication (NFC) network.

4. The method of claim 2, wherein the method further comprises sending a notification when placing the apparatus in the low-power mode, to alert a user that the apparatus is leaving a coverage of the Wi-Fi network.

5. The method of claim 4, wherein the placing of the apparatus in the low-power mode comprises performing at least one of:
   deactivating a Global Positioning System (GPS) sensor of the apparatus; and
   increasing a time interval for pinging a wireless network to which the apparatus is communicatively connected.

6. The method of claim 1 further comprising:
   identifying a change in the location of the apparatus; and
   placing the apparatus in a silent mode in response to the change in the location of the apparatus.

7. The method of claim 1 further comprising:
   detecting that the location of the apparatus has changed; and
   sending a notification in response to the detecting.

8. The method of claim 1, further comprising:
performing, by the processor, either:
determining, based on a usage history of the apparatus, a rule corresponding to the identified type of the location, or
prompting a user of the apparatus to input the rule; and
determining, by the processor based on the rule, which one or more of the plurality of acts to be performed.

9. A non-transitory computer-readable storage medium storing computer-executable instructions that upon execution cause one or more processors to perform actions comprising:
determining, by a processor, a location of an apparatus based on information associated with a wireless network with which the apparatus is in communication;
identifying a type of the location and a Wi-Fi network associated with the location; and
performing, based on a result of the identifying, one or more of a plurality of acts comprising:
detecting a repeating pattern that includes a high usage within a time slot in the identified type of the location;
associating the high usage with the identified type of the location; and
configuring the apparatus to activate a full-power mode when the processor detects the identified type of the location.

10. The non-transitory computer-readable storage medium of claim 9, wherein the actions further comprise:
identifying a change in the location of the apparatus; and
placing the apparatus in a low-power mode in response to the change in the location of the apparatus.

11. The non-transitory computer-readable storage medium of claim 9, wherein the information associated with the wireless network comprises a cell identification (ID) of a base station, at least one of a Service Set Identifier (SSID) and a Media Access Control (MAC) address of the Wi-Fi network, a Universal Unique Identifier (UUID) of a Bluetooth Low Energy (BLE) network, or a Unique Identifier (UID) of a Near Field Communication (NFC) network.

12. The non-transitory computer-readable storage medium of claim 10, wherein the actions further comprise sending a notification when placing the apparatus in the low-power mode, to alert a user that the apparatus is leaving a coverage of the wireless network.

13. The non-transitory computer-readable storage medium of claim 12, wherein the placing of the apparatus in the low-power mode comprises:
deactivating a Global Positioning System (GPS) sensor of the apparatus; and
increasing a time interval for pinging a wireless network to which the apparatus is communicatively connected.

14. The non-transitory computer-readable storage medium of claim 9 further comprising: identifying a change in the location of the apparatus; and placing the apparatus in a silent mode in response to the change in the location of the apparatus.

15. The non-transitory computer-readable storage medium of claim 9 further comprising:
detecting that the location of the apparatus has changed; and
sending a notification in response to the detecting.

16. The non-transitory computer-readable storage medium of claim 9, wherein the method further comprises:
performing either:
determining, based on a usage history of the apparatus, a rule corresponding to the identified type of the location, or
prompting a user of the apparatus to input the rule; and
determining, based on the rule, which one or more of the plurality of acts to be performed.

17. An apparatus, comprising:
a processor; and
memory having instructions stored therein such that, when executed by the processor, the instructions cause the processor to perform operations comprising:
determining a location of the apparatus;
identifying a type of the location and a Wi-Fi network associated with the location; and
performing, based on a result of the identifying, one or more of a plurality of acts comprising:
detecting a repeating pattern behavior at a time slot in the location;
detecting a high usage at the time slot;
associating the high usage at the time slot with the identified type of the location; and
configuring the apparatus to activate a full-power mode when the processor detects the Wi-Fi network at the identified type of the location.

18. The apparatus of claim 17, wherein the memory further comprises instructions that, when executed by the processor, cause the processor to place the apparatus in a low-power mode and send a notification to alert a user that the apparatus is leaving a coverage of the Wi-Fi network that is associated with the high usage.

19. The apparatus of claim 18, wherein, in placing the apparatus in the low-power mode, the processor performs at least one of:
deactivating a Global Positioning System (GPS) sensor of the apparatus; and
increasing a time interval for pinging a wireless network to which the apparatus is communicatively connected.

20. The apparatus of claim 17, wherein, when executed by the processor, the instructions further cause the processor to perform operations comprising:
performing either:
determining, based on a usage history of the apparatus, a rule corresponding to the identified type of the location, or
prompting a user of the apparatus to input the rule; and
determining, based on the rule, which one or more of the plurality of acts to be performed.

* * * * *